(12) United States Patent
Okada (10) Patent No.: US 8,956,691 B2
(45) Date of Patent: Feb. 17, 2015

(54) METHODS FOR MANUFACTURING ORGANIC-INORGANIC COMPOSITE PARTICLES, OPTICAL MATERIAL, OPTICAL ELEMENT AND LENS, AND ORGANIC-INORGANIC COMPOSITE PARTICLES

(75) Inventor: Seiji Okada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1016 days.

(21) Appl. No.: 13/009,481

(22) Filed: Jan. 19, 2011

(65) Prior Publication Data

US 2011/0177239 A1 Jul. 21, 2011

(30) Foreign Application Priority Data

Jan. 21, 2010 (JP) ................... 2010-011422

(51) Int. Cl.
- *B05D 5/06* (2006.01)
- *G02B 1/04* (2006.01)
- *C09D 123/18* (2006.01)
- *C08K 5/5425* (2006.01)

(52) U.S. Cl.
CPC .............. *G02B 1/041* (2013.01); *C09D 123/18* (2013.01); *C08K 5/5425* (2013.01)
USPC ........... 427/162; 427/214; 427/215; 427/220; 427/221

(58) Field of Classification Search
CPC .................................. B05D 5/06; C08F 32/08
USPC .................... 427/214, 215, 220, 221
See application file for complete search history.

(56) References Cited

U.S. PATENT DOCUMENTS 5,096,644 A * 3/1992 Endo et al. ..................... 264/137
2004/0109995 A1 6/2004 Wakiya (Continued)

FOREIGN PATENT DOCUMENTS

| JP | 2006-161000 A | 6/2006 |
| JP | 2007-238930 A | 9/2007 |

(Continued)

OTHER PUBLICATIONS

Machine translation JP 2008-120848, accessed Jun. 10, 2014.*

*Primary Examiner* — Elizabeth Burkhart
(74) *Attorney, Agent, or Firm* — Canon U.S.A., Inc. IP Division

(57) ABSTRACT

A method for producing organic-inorganic composite particles includes preparing a cyclic olefin monomer expressed by general formula (1) and inorganic particles coated with a compound having a carbon-carbon double bond, and binding at least one of the cyclic olefin monomer and a cyclic olefin polymer derived from the cyclic olefin monomer to the carbon-carbon double cong by bringing the cyclic olefin monomer into contact with the inorganic particles in the presence of a catalyst for ring opening metathesis polymerization of the cyclic olefin monomer:

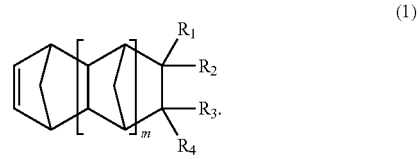

(1)

7 Claims, 4 Drawing Sheets

(56) References Cited

U.S. PATENT DOCUMENTS

| | | |
|---|---|---|
| 2006/0128869 A1 | 6/2006 | Taima |
| 2009/0017280 A1* | 1/2009 | Suzuki et al. ............... 428/220 |
| 2009/0143510 A1* | 6/2009 | Lin et al. ...................... 524/114 |
| 2010/0144924 A1* | 6/2010 | Yoshiwara et al. ........... 523/218 |

FOREIGN PATENT DOCUMENTS

| | | | |
|---|---|---|---|
| JP | 2008-120848 | * | 5/2008 |
| JP | 2008-163249 A | | 7/2008 |
| WO | WO 2008/081885 | * | 7/2008 |
| WO | 2009/119899 A | | 10/2009 |

* cited by examiner

| | INORGANIC PARTICLE | SURFACE MODIFIER ||||| CHAIN TRANSFER AGENT | CYCLIC OLEFIN MONOMER ||| COMPOUND HAVING CARBON-CARBON DOUBLE BOND / CYCLIC OLEFIN MONOMER RATIO | WEIGHT AVERAGE MOLECULAR WEIGHT OF CYCLIC OLEFIN POLYMER | DISPERSI-BILITY TEST | VOLUME AVERAGE PARTICLE SIZE |
|---|---|---|---|---|---|---|---|---|---|---|---|---|---|---|
| | | COMPOUND HAVING CARBON-CARBON DOUBLE BOND | DISPERSANT |||| | | | | | | | |
| | | Allyl–Si | Decyl–Si | CyPentyl–Si | polyDCPD–Si | 1–HEXENE | DCPD | EdNB | TCD | | | | |
| EXAMPLE 1 | γ-Alumina 3.0 g | 1.5 g | 1.5 g | — | — | — | 3.0 g | — | — | 3.2 mol% | 5.0 × 10³ | GOOD | 30 nm |
| EXAMPLE 2 | γ-Alumina 3.0 g | 2.0 g | 1.0 g | — | — | — | 3.0 g | — | — | 4.1 mol% | 4.6 × 10³ | GOOD | 25 nm |
| EXAMPLE 3 | γ-Alumina 3.0 g | 2.25 g | 0.75 g | — | — | — | 3.0 g | — | — | 4.9 mol% | 3.9 × 10³ | GOOD | 21 nm |
| EXAMPLE 4 | γ-Alumina 3.0 g | 2.25 g | 0.75 g | — | — | — | — | 3.0 g | — | 4.4 mol% | 4.5 × 10³ | GOOD | 24 nm |
| EXAMPLE 5 | γ-Alumina 3.0 g | 2.25 g | 0.75 g | — | — | — | — | — | 3.0 g | 5.9 mol% | 2.9 × 10³ | GOOD | 20 nm |
| EXAMPLE 6 | γ-Alumina 3.0 g | 2.25 g | 0.75 g | — | — | — | 2.1 g | 0.9 g | — | 4.2 mol% | 4.8 × 10³ | GOOD | 28 nm |
| EXAMPLE 7 | Ta₂O₅ 3.0 g | 2.0 g | 1.0 g | — | — | — | 3.0 g | — | — | 4.1 mol% | 5.0 × 10³ | GOOD | 17 nm |
| COMPARATIVE EXAMPLE 1 | γ-Alumina 3.0 g | — | 3.0 g | — | — | 0.1 g | 3.0 g | — | — | 5.2 mol% | — | BAD | — |
| COMPARATIVE EXAMPLE 2 | γ-Alumina 3.0 g | — | — | 3.0 g | — | 0.1 g | 3.0 g | — | — | 5.2 mol% | — | BAD | — |
| COMPARATIVE EXAMPLE 3 | γ-Alumina 1.0 g | — | — | — | 4.0 g | — | — | — | — | — | 5.1 × 10³ | FAIR | 55 nm |

METHODS FOR MANUFACTURING ORGANIC-INORGANIC COMPOSITE PARTICLES, OPTICAL MATERIAL, OPTICAL ELEMENT AND LENS, AND ORGANIC-INORGANIC COMPOSITE PARTICLES

BACKGROUND OF THE INVENTION

1. Field of the Invention

The present invention relates to methods for manufacturing organic-inorganic composite particles, an optical material, an optical element and a lens, and to an organic-inorganic composite particles.

2. Description of the Related Art

Glass used as optical materials for lenses and other optical elements has been being replaced with organic polymers. Among such organic polymers, cyclic olefin polymers are superior in transparency, low water absorption and moldability, and are widely used as optical materials accordingly.

Optical materials are widely used in the field of optical elements used in various optical apparatuses, such as cameras including still cameras and video cameras, optical pickup devices for CDs, MOs, DVDs and other optical media, and office automation apparatuses including copy machines and printers. Such an optical material is required to have superior optical characteristics, such as high light transmittance and high refractive index, high stability in refractive index to temperature, low coefficient of linear expansion, high thermal stability, high hardness, low water absorption, high weather resistance, high solvent resistance, and so forth.

However, it is difficult to enhance these characteristics significantly only by use of cyclic olefin polymers. In order to solve these issues, it has been proposed to enhance various characteristics of optical material by dispersing inorganic particles in a cyclic olefin polymer. In this instance, the inorganic particles are each coated with a surface modifier to prevent the aggregation of the particles.

Japanese Patent Laid-Open No. 2006-161000 discloses a method for enhancing the dispersibility of inorganic particles in thermoplastic resins such as cyclic olefin polymers by modifying the surfaces of the inorganic particles with a silane coupling agent such as tetramethoxysilane. Japanese Patent Laid-Open No. 2007-238930 discloses a method for manufacturing a molded lens by heating and compressing an organic-inorganic composite composition prepared by mixing inorganic particles and a thermoplastic resin having a functional group capable of forming chemical bonds with the inorganic particles, such as a cyclic olefin polymer.

In the method disclosed in Japanese Patent Laid-Open No. 2006-161000, however, only a silane coupling agent is used to enhance the dispersibility. Consequently, some characteristics such as coefficient of linear expansion and heat resistance may be degraded.

In the method disclosed in Japanese Patent Laid-Open No. 2007-238930, since the functional group is chemically bound to inorganic particles not surface-modified, the inorganic particles may undesirably aggregate to increase the particle size.

SUMMARY OF THE INVENTION

The present invention provides a method for producing small organic-inorganic composite particles superior in dispersibility in cyclic olefin polymers. The present invention also provides an optical material and an optical element that contain organic-inorganic composite particles.

According to an aspect of the invention, a method is provided for producing organic-inorganic composite particles. The method includes preparing a cyclic olefin monomer expressed by general formula (1) and inorganic particles, each coated with a compound carbon-carbon double bond, and binding at least one of the cyclic olefin monomer and a cyclic olefin polymer derived from the cyclic olefin monomer to the carbon-carbon double bond by bringing the cyclic olefin monomer into contact with the inorganic particles in the presence of a catalyst for ring opening metathesis polymerization of the cyclic olefin monomer.

(1)

In formula (1), $R_1$ to $R_4$ are each selected from the group consisting of hydrogen, halogens, functional groups and hydrocarbon groups. The functional group includes at least one atom selected from the group consisting of oxygen, nitrogen and silicon. The hydrocarbon group may or may not have a substituent and has a carbon number in the range of 1 to 20. The substituent of the hydrocarbon group is a functional group including at least one atom selected from the groups consisting of halogens, oxygen, nitrogen and silicon. $R_1$ and $R_4$ may be bound with each other, and m represents an integer of 0 to 2.

According to another aspect of the invention, organic-inorganic composite particles are provided which include tantalum oxide particles or aluminium oxide particles and a cyclic olefin polymer coating the surfaces of the particles. The composite particles have a volume average particle size of 30 nm or less.

The organic-inorganic composite particles produced by the above method include a cyclic olefin monomer or cyclic olefin polymer bound thereto, and have a small particle size.

Further features of the present invention will become apparent from the following description of exemplary embodiments with reference to the attached drawings.

DESCRIPTION OF THE EMBODIMENTS

An embodiment of the present invention will be described in detail with reference to FIG. 1. Organic-inorganic composite particles of the present embodiment have the following features:

(i) The step (S11) of preparing a cyclic olefin monomer expressed by the following general formula (1) and the step (S12) of preparing inorganic particles coated with a compound having a carbon-carbon double bond; and (ii) The step of binding at least either the cyclic olefin monomer or a cyclic olefin polymer derived from the cyclic olefin monomer to the carbon-carbon double bond by bringing the cyclic olefin monomer into contact with the inorganic particles in the presence of a catalyst for ring opening metathesis polymerization of the cyclic olefin monomer (S13).

(1)

In formula (1), $R_1$ to $R_4$ are each selected from among hydrogen, halogens, functional groups and hydrocarbon groups. The functional group includes at least one atom selected from the group consisting of oxygen, nitrogen and silicon. The hydrocarbon group may or may not have a substituent and has a carbon number in the range of 1 to 20. The substituent of the hydrocarbon group is a functional group including at least one atom selected from the group consisting of halogens, oxygen, nitrogen and silicon. $R_1$ and $R_4$ may be bound with each other. m Represents an integer of 0 to 2.

Figure 1:
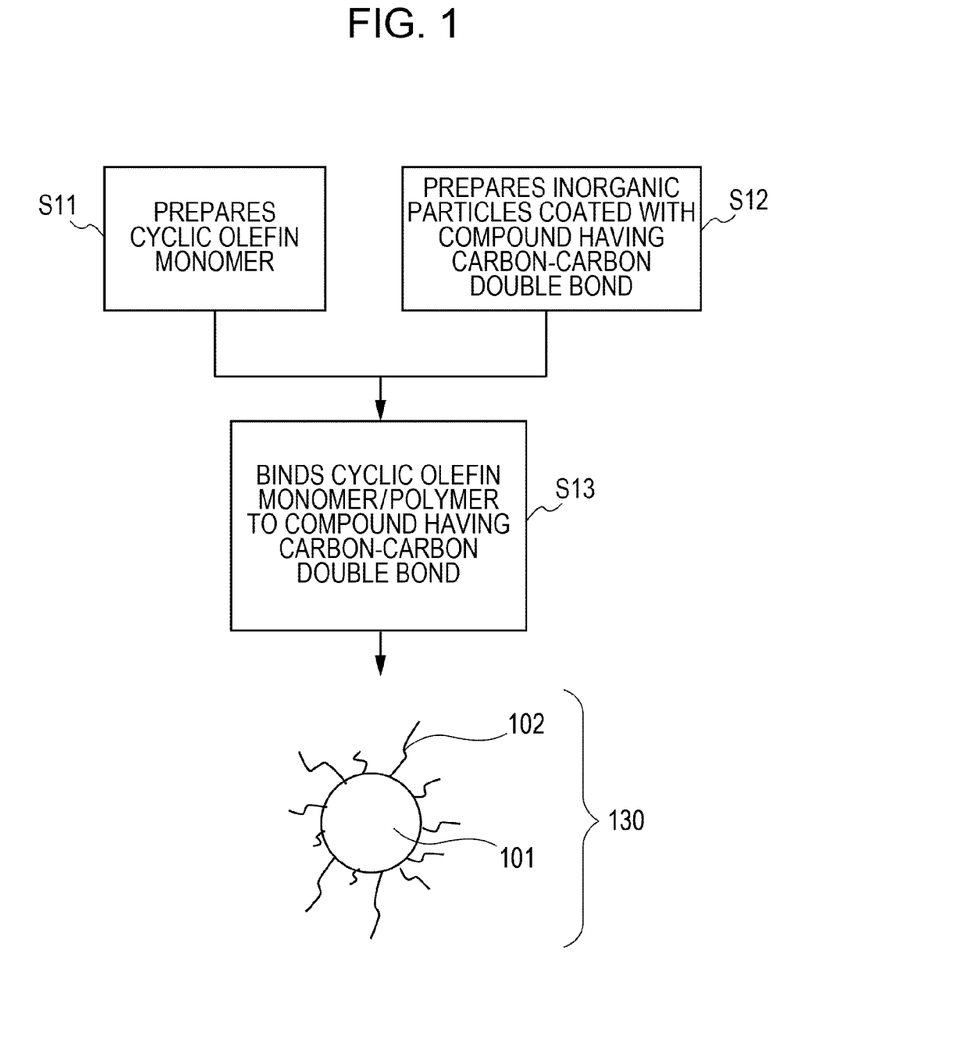
FIG. 1 is a flow diagram of a method for producing organic-inorganic composite particles according to an embodiment of the present invention.

Through the above steps, organic-inorganic composite particles 103 are produced which include inorganic particles 101 coated with a compound having a carbon-carbon double bond to which a cyclic olefin monomer or a cyclic olefin polymer 102 is bound, as shown in FIG. 1.

Binding of a cyclic olefin polymer derived from a cyclic olefin monomer or cyclic olefin polymer to the carbon-carbon double bond of the compound having a carbon-carbon double bond means that this compound is bound to the cyclic olefin monomer or cyclic olefin polymer by a metathesis reaction between the carbon-carbon double bond of the compound and the carbon-carbon double bond of the ring structure of the cyclic olefin monomer or cyclic olefin polymer.

Figure 2:
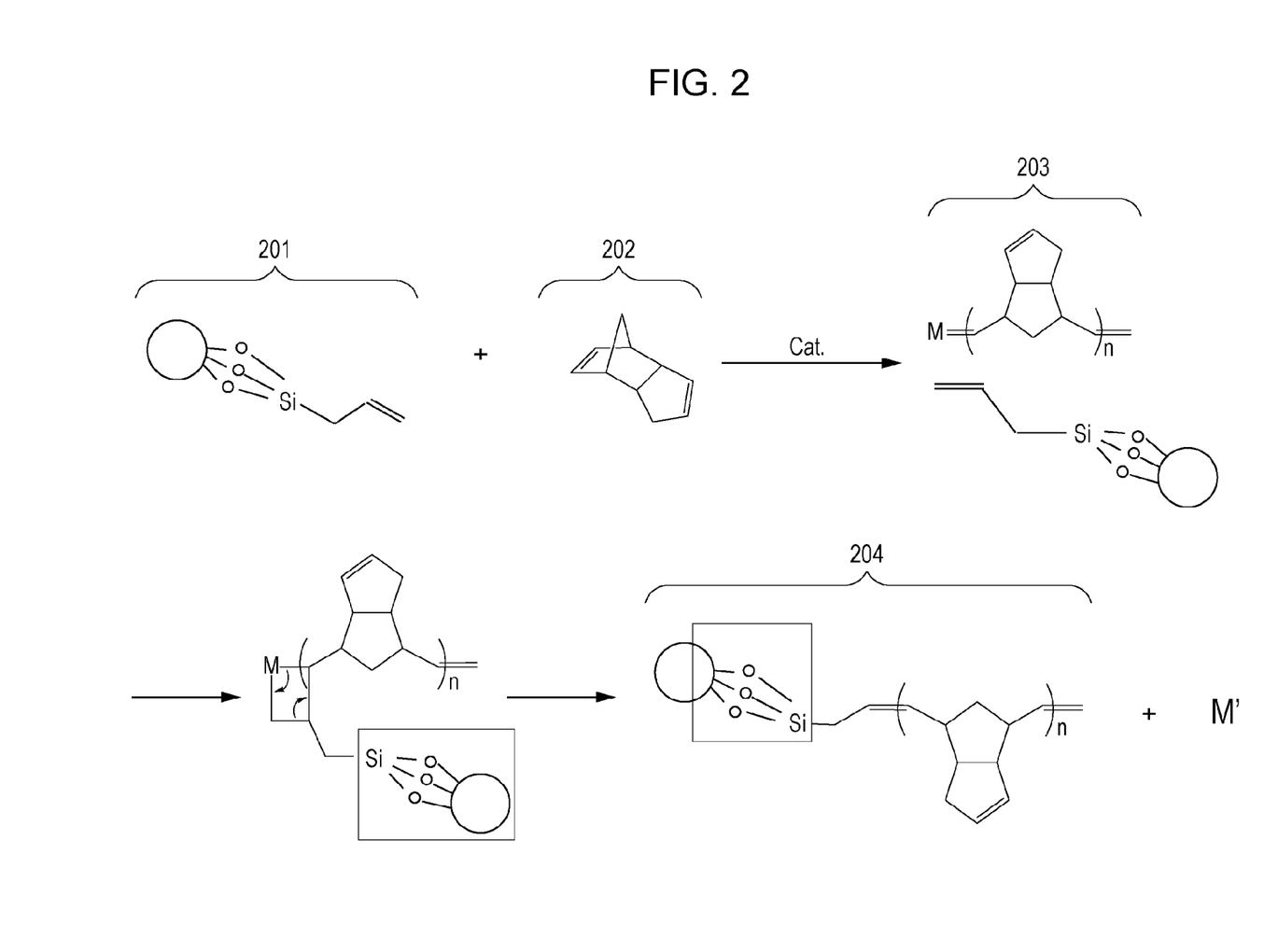
FIG. 2 is a representation of a reaction mechanism in a production process of organic-inorganic composite particles, according to an embodiment of the present invention.

For the sake of easy understanding, an exemplary mechanism for producing the organic-inorganic composite particles in the present embodiment will now be described in detail with reference to FIG. 2. In the mechanism shown FIG. 2, allyltrimethoxysilane is used as an example of the compound having a carbon-carbon double bond, and dicyclopentadiene is used as an example of the cyclic olefin monomer.

(1) Inorganic particles 201 coated with allyltrimethoxysilane and a cyclic olefin monomer dicyclopentadiene 202 are prepared.

(2) The cyclic olefin monomer reacts with a polymerization catalyst (cat.) for ring opening metathesis polymerization of the cyclic olefin monomer to promote the ring opening metathesis polymerization, thus yielding a cyclic olefin polymer 203 bound with the polymerization catalyst (hereinafter may be referred to as polymerization catalyst-bound cyclic olefin polymer 203). In FIG. 2, the polymerization catalyst is represented only by the transition element M thereof.

(3) Once the cyclic olefin polymer 203 prepared in the above operation of (2) comes close to the carbon-carbon double bond of the inorganic particles 201, the polymerization catalyst-bound cyclic olefin polymer 203 is chain-transferred. Consequently, the polymerization catalyst-bound cyclic olefin polymer 203 binds with the carbon-carbon double bond of the inorganic particles to produce organic-inorganic composite particles 204 and a catalytically active species M'. Binding of the cyclic olefin polymer to the carbon-carbon double bond means that a structure such as the organic-inorganic composite particles 204 shown in FIG. 2 is formed by a metathesis reaction between the carbon-carbon double bond of the ring structure of the cyclic olefin polymer and the carbon-carbon double bond of the compound having a carbon-carbon double bond.

The cyclic olefin monomer may react with the carbon-carbon double bond of the compound having a carbon-carbon double bond (but not shown). In this instance, organic-inorganic composite particles bound with the cyclic olefin monomer are produced. In this instance, the compound designated by reference numeral 203 in FIG. 2 has n of 1; hence, the cyclic olefin polymer 203 bound with the polymerization catalyst is a cyclic olefin monomer 202 bound with the polymerization catalyst.

(4) The catalytically active species M' reacts with the cyclic olefin monomer to produce a cyclic olefin polymer 203. The reactions of (2) and (3) are thus repeated.

Thus organic-inorganic composite particles are produced which include inorganic particles whose surfaces are coated with a cyclic olefin polymer.

Step of (1)

The cyclic olefin monomer, the compound having a carbon-carbon double bond and the inorganic particles will be defined below.

Step of (2)

The cyclic olefin monomer reacts with a catalyst for ring opening metathesis polymerization of the cyclic olefin monomer, so that the cyclic olefin monomer is subjected to ring-opening metathesis polymerization to produce a cyclic olefin polymer. On the other hand, the cyclic olefin monomer comes into contact with the inorganic particles in the presence of the polymerization catalyst, so that at least either the cyclic olefin monomer or the cyclic olefin polymer is bound to the carbon-carbon double bond of the inorganic particles. Thus organic-inorganic composite particles are produced which include inorganic particles whose surfaces are coated with at least either the cyclic olefin monomer or the cyclic olefin polymer. Since the inorganic particles are coated with the cyclic olefin monomer or the cyclic olefin polymer, they do not easily aggregate with each other. On the other hand, if it is attempted to bind a polymer to inorganic particles whose surfaces are not modified, the polymer is not successfully bound to the inorganic particles. Consequently, the inorganic particles may aggregate with each other to increase the particle size. The polymerization catalyst for ring opening metathesis polymerization will be described later.

The ratio of the compound having a carbon-carbon double bond to the cyclic olefin monomer can be in the range of 0.01 to 100 mol %. Since the cyclic olefin monomer is polymerized into a cyclic olefin polymer and the cyclic olefin polymer binds with the carbon-carbon double bond, the resulting organic-inorganic composite particles can have long polymer chains when the compound having a carbon-carbon double bond is present in such a proportion. In an embodiment, the ratio of the compound having a carbon-carbon double bond to the cyclic olefin monomer can be in the range of 3.0 to 6.0 mol %.

Inorganic Particles

The material of the inorganic particles can be selected from inorganic compounds that can enhance the optical characteristics and mechanical characteristics. Examples of the material of the inorganic particles include oxides, such as silicon oxide, aluminium oxide, titanium oxide, niobium oxide, tantalum oxide, zirconium oxide, zinc oxide, magnesium oxide, tellurium oxide, yttrium oxide, indium oxide, tin oxide, and indium tin oxide; complex oxides, such as lithium niobate, potassium niobate, and lithium tantalate; sulfides, such as zinc sulfide and cadmium sulfide; compound semiconductors, such as zinc selenide, cadmium selenide, zinc telluride, and cadmium telluride; and metals such as gold. Among those, oxides can be selected in an embodiment. Core-shell inorganic particles may be used which include particles of an inorganic species coated with another inorganic component.

The inorganic particles can have a crystallite size of 30 nm or less, such as 10 nm or less, from the viewpoint of obtaining desired characteristics without adversely affecting the transparency of the cyclic olefin-inorganic composite material. The inorganic particles may have any shape, such as spherical, oval, depressed, or rod-like shape.

The crystallite size of the inorganic particles mentioned herein is that measured by X-ray diffraction (with RINT 2100 manufactured by Rigaku).

Compound Having Carbon-Carbon Double Bond

The compound having a carbon-carbon double bond used in the embodiments of the invention includes a chain structure, and the chain structure has the carbon-carbon double bond. However, if a compound having a carbon-carbon double bond includes a ring structure and only the ring structure has the carbon-carbon double bond, this compound does not apply. Exemplary compounds having a carbon-carbon double bond in their chain structures have functional groups such as a vinyl group ($CH_2=CH-$), a vinylidene group ($CH_2=C<$), and a vinylene group ($-CH=CH-$). In particular, compounds having a carbon-carbon double bond of a vinyl group are likely to have high reactivity with cyclic olefin monomers. The compound having a carbon-carbon double bond used in the present embodiment may have only one or some of those functional groups.

When the compound having a carbon-carbon double bond has a functional group of a vinyl, vinylidene or vinylene group, a metathesis reaction occurs between the functional group and the carbon-carbon double bond of the ring structure of a cyclic olefin polymer derived from a cyclic olefin monomer or cyclic olefin polymer, and thus binds the compound to the cyclic olefin monomer or cyclic olefin polymer. FIG. 2 shows a reaction in which a compound having a vinyl group is used as the compound having a carbon-carbon double bond.

The compound having a carbon-carbon double bond can further include a functional group that can react with inorganic particles.

The functional group capable of chemically binding with the inorganic particles is not particularly limited as long as it can form a covalent bond, an ionic bond, a coordinate bond, or a hydrogen bond. Examples of the functional group capable of chemically binding with the inorganic particles include carboxylic, acyl halides, sulfonate, phosphate, phosphonate, amino, amide, thiol, alkoxysilyl, silyl halides, alkoxytitanyl, and titanyl halides. Among those, alkoxy silyl may be particularly selected from the viewpoint of the reactivity with the surfaces of the inorganic particles.

Examples of the compound having a carbon-carbon double bond include allyltrimethoxysilane, methoxydimethylvinylsilane, trimethoxyvinylsilane, diethoxydivinylsilane, triethoxyvinylsilane, allyltriethoxysilane, 3-allylaminopropyltrimethoxysilane, p-styryltrimethoxysilane, triisopropoxyvinylsilane, 3-acryloxypropyldimethoxymethylsilane, 3-acryloxypropyltrimethoxysilane, vinyltrichlorosilane, methylvinylchlorosilane, divinyldichlorosilane, allylmethyldichlorosilane, and dimethylvinylchlorosilane.

Inorganic Particles Coated with Compound Having Carbon-Carbon Double Bond

In the present embodiment, the inorganic particles coated with a compound having a carbon-carbon double bond mean that almost all or all the surfaces of the inorganic particles are coated. The compound having a carbon-carbon double bond can be chemically bound to the surfaces of the inorganic particles.

Each of the inorganic particles can be coated with at least 10% by mass, such as 20% by mass, of the compound having a carbon-carbon double bond. Inorganic particles coated with at least 10% by mass of a compound having a carbon-carbon double bond are unlikely to reduce the grafting rate of the cyclic olefin polymer, and can be dispersed in the cyclic olefin polymer.

Dispersant

In order to enhance the dispersibility of the inorganic particles, a dispersant may be used, and further, may be chemically bound with the inorganic particles.

In the present embodiment, the dispersant is compatible with the organic solvent used in the preparation of the inorganic particles coated with a compound having a carbon-carbon double bond and has a functional group capable of chemically binding with the inorganic particles, and any of such dispersants may be used as long as it is not involved in the reaction of ring opening metathesis polymerization.

The functional group capable of chemically binding with the inorganic particles may be the same as or different from the functional group capable of chemically binding with the inorganic particles of the compound having a carbon-carbon double bond.

Examples of the dispersant include 3-aminopropyltrimethoxysilane, 3-mercaptopropyltrimethoxysilane, 3-mercaptopropyltriethoxysilane, 3-glycidoxypropyltrimethoxysilane, methyltrimethoxysilane, dimethyldimethoxysilane, trimethylmethoxysilane, n-propyltrimethoxysilane, n-butyltriethoxysilane, n-hexyltrimethoxysilane, n-hexyltriethoxysilane, n-octyltriethoxysilane, n-decyltrimethoxysilane, cyclopentyltrimethoxysilane, phenyltrimethoxysilane, and diphenyldimethoxysilane.

If a dispersant is used, the dispersant can be added in a proportion of 500% by mass or less, such as 100% by mass or less, relative to the compound having a carbon-carbon double bond. When 500% by mass or less of dispersant is used, the optical characteristics and mechanical characteristics of the inorganic particles are unlikely to be affected by the dispersant, and it is expected that an optical material having desired characteristics can be produced.

The total amount of the compound having a carbon-carbon double bond and the dispersant (hereinafter, both are collectively referred to as surface modifier) can be 10% by mass or more, such as 20% by mass or more, relative to the inorganic particles. The use of 10% by mass or more of surface modifier is expected to prevent the inorganic particles from aggregating in an organic solvent during the production of the inorganic particles coated with a compound having a carbon-carbon double bond.

Preparation of Inorganic Particles Coated with Compound Having a Carbon-Carbon Double Bond The process for coating the inorganic particles with a compound having a carbon-carbon double bond is not particularly limited. In a process for coating, a chemical bond may be formed between the surfaces of the inorganic particles and the compound having a carbon-carbon double bond. A wet dispersion process can be applied in which the inorganic particles coated with a compound having a carbon-carbon double bond are produced by adding inorganic particles and a compound having a carbon-carbon double bond to an organic solvent or the like. The above-described dispersant may be added together if necessary when the inorganic particles coated with a compound having a carbon-carbon double bond are prepared.

The wet dispersion process may be performed with ultrasonic waves, in a bead mill, a ball mill or a jet mill, by stirring, or under high-pressure high-temperature conditions. The inorganic particles used in this stage may be a solid, or a sol being a dispersion in a liquid.

The organic solvent is not particularly limited, and can be compatible with the compound having a carbon-carbon double bond. Examples of the organic solvent include aliphatic hydrocarbons, such as pentane, hexane, heptane, decane, and cyclohexane; aromatic hydrocarbons, such as benzene, toluene, and xylene; ketones, such as acetone, methyl ethyl ketone, methyl isobutyl ketone, and cyclohexanone; esters, such as methyl acetate, ethyl acetate, propyl acetate, and butyl acetate; ethers, such as diethyl ether, dimethoxyethane, tetrahydrofuran, and dioxane; alcohols, such as methanol, ethanol, propanol, isopropanol, butanol, and cyclohexanol; and halogen-containing solvents, such as chloroform, 1,2-dichloroethane, methylene chloride, carbon tetrachloride, trichloroethylene, tetrachloroethylene, chlorobenzene, tetrachloroethane, and bromobenzene. These solvents may be used singly or in combination.

In the wet dispersion process, 1% to 50% by mass of inorganic particles can be used relative to the organic solvent. High productivity is expected by use of 1% by mass or more of inorganic particles. The use of 50% or less of inorganic particles is expected to prevent the increase of the viscosity of the reaction liquid, and accordingly the reaction liquid can be efficiently stirred so that the particle size of the inorganic particles can be reduced.

In order to enhance the reactivity between the surfaces of the inorganic particles and the surface modifier, an additive such as an acid or a base may be added. The additive is not particularly limited unless it dissolves the inorganic particles. Examples of the additive include hydrochloric acid, sulfuric acid, nitric acid, carboxylic acid compounds, organic sulfonic acid compounds, ammonia (including ammonia solution), amines, and hydroxides of alkali metals or alkaline-earth metals, such as sodium hydroxide and potassium hydroxide. The additive can be added in a proportion of 0.01% to 50% by mass, such as 0.1% to 30% by mass, relative to the surface modifier. If the mass ratio of the additive to the surface modifier is 0.01% or more, the reactivity can be easily increased. If the mass ratio of the additive is 50% or less, the additive can be easily removed.

The resulting inorganic particles coated with a compound having a carbon-carbon double bond may be used in a state where the particles are dispersed in an organic solvent, as they are, or may be used after being purified by removing the free part of the surface modifier, not involved in the surface treatment without being chemically bound to the surfaces of the inorganic particles.

The surface modifier may be removed by any method without particular limitation, and, for example, by ultrafiltration, centrifugation, or reprecipitation. The organic solvent of the dispersion liquid of the inorganic particles coated with a compound having a carbon-carbon double bond may be removed, and the particles in a powder state may be used in a subsequent step.

Cyclic Olefin Monomer

The cyclic olefin monomer used in the present embodiment is expressed by the following general formula (1):

(1)

In formula (1), $R_1$ to $R_4$ are each selected from the group consisting of hydrogen, halogens, functional groups and hydrocarbon groups. The functional group includes at least one atom selected from the group consisting of oxygen, nitrogen and silicon. The hydrocarbon group may or may not have a substituent and has a carbon number in the range of 1 to 20. The substituent of the hydrocarbon group is a functional group including at least one atom selected from the group consisting of halogens, oxygen, nitrogen and silicon. $R_1$ and $R_4$ may be bound with each other. m Represents an integer of 0 to 2.

The halogens include fluorine, chlorine, bromine and iodine.

Examples of the functional group including at least one atom selected from the group consisting of oxygen, nitrogen and silicon include alkoxysilyl, ester, carboxyl, acid anhydride, epoxy, hydroxy, amino, cyano, nitro, amide, and imide.

Examples of the hydrocarbon groups having a carbon number of 1 to 20 include methyl, ethyl, n-propyl, iso-propyl, n-butyl, sec-butyl, tert-butyl, pentyl, neopentyl, hexyl, octyl, decyl, cyclopentyl, cyclohexyl, vinyl, ethylidene, phenyl, benzyl, biphenyl, and naphthyl. Examples of the cyclic olefin monomer of m=0 are as follows: cyclic olefin monomers in which $R_1$ to $R_4$ are each hydrogen or a hydrocarbon group, such as norbornene, 5-methylnorbornene, 5-ethylnorbornene, 5-butylnorbornene, 5-hexylnorbornene, 5-decylnorbornene, 5-cyclohexylnorbornene, 5-cyclopentylnorbornene, 5-ethylidenenorbornene, 5-vinylnorbornene, 5-propenylnorbornene, 5-cyclohexenylnorbornene, 5-cuclopentenylnorbornene, and 5-phenylnorbornene; Cyclic olefin monomers in which $R_1$ to $R_4$ are each a functional group having oxygen or a hydrocarbon group including a functional group having oxygen, such as 5-methoxycarbonylnorbornene, 5-ethoxycarbonylnorbornene, 5-methyl-5-methoxycarbonylnorbornene, 5-methyl-5-ethoxycarbonylnorbornene, norbornenyl-2-methylpropionate, norbornenyl-2-methyloctanate norbornene-5,6-dicarboxylic acid anhydride, 5-hydroxymethylnorbornene, 5,6-di(hydroxymethyl)norbornene, 5,5-di(hydroxymethyl)norbornene, 5-hydroxy-1-propylnorbornene, 5,6-dicarboxynorbornene, and 5-methoxycarbonyl-6-carboxynorbornene; cyclic olefin monomer in which $R_1$ to $R_4$ are each a functional group including nitrogen or a hydrocarbon group having a functional group including nitrogen, such as 5-cyanonorbornene and norbornene-5,6-dicarboxylic acid imide; and cyclic olefin monomer in which $R_1$ and $R_4$ are bound to each other to form a ring, such as dicyclopentadiene, tricyclo[4.3.12, 5.0]deca-3-ene, tricyclo[4.4.12, 5.0]undeca-3-ene, tetracyclo[6.5.12,5.01, 6.08,13]trideca-3,8,10,12-tetraene (may be called 1,4-methano-4,4a,9,9a-tetrahydrofluorene), and tetracyclo [6.6.12,5.01,6.08,13]tetradeca-3,8,10,12-tetraene (may be called 1,4-methano-1,4,4a,5,10,10a-hexahydroanthracene).

Examples of the cyclic olefin monomer of m=1 are as follows. cyclic olefin monomers in which $R_1$ to $R_4$ are each hydrogen or a hydrocarbon group, such as; tetracyclododecene, 8-methyltetracyclododecene, 8-ethyltetracyclododecene, 8-cyclohexyltetracyclododecene, 8-cyclopentyltetracyclododecene, 8-methylidenetetracyclododecene, 8-ethylidenetetracyclododecene, 8-vinyltetracyclododecene, 8-propenyltetracyclododecene, 8-cyclohexenyltetracyclododecene, 8-cyclopentenyltetracyclododecene, and 8-phenyltetracyclododecene; cyclic olefin monomers in which $R_1$ to $R_4$ are each a functional group including oxygen or a hydrocarbon group having a functional group including oxygen, such as 8-methoxycarbonyltetracyclododecene, 8-methyl-8-methoxycarbonyltetracyclododecene, 8-hydroxymethyltetracyclododecene, 8-carboxytetracyclododecene, tetracyclododecene-8,9-dicarboxylic acid, and tetracyclododecene-8,9-dicarboxylic acid anhydride; cyclic olefin monomer in which $R_1$ to $R_4$ are each a functional group including nitrogen or a hydrocarbon group having a functional group including nitrogen, such as 8-cyanotetracyclododecene and tetracyclododecene-8,9-dicarboxylic acid imide; cyclic olefin monomer in which $R_1$ to $R_4$ are each a halogen, or a hydrocarbon group having a functional group including a halogen, such as 8-chlorotetracyclododecene; cyclic olefin monomer in which $R_1$ to $R_4$ are each a functional group including silicon or a hydrocarbon group having a functional group including silicon, such as 8-trimethoxysilyltetracyclododecene.

Examples of the cyclic olefin monomer of m=2 are as follows: cyclic olefin monomers in which $R_1$ to $R_4$ are each hydrogen or a hydrocarbon group, such as hexacycloheptadecene, 12-methylhexacycloheptadecene, 12-ethylhexacycloheptadecene, 12-cyclohexylhexacycloheptadecene, 12-cyclopentylhexacycloheptadecene, 12-methylidenehexacycloheptadecene, 12-ethylidenehexacycloheptadecene, 12-vinylhexacycloheptadecene, 12-propenylhexacycloheptadecene, 12-cyclohexenylhexacycloheptadecene, 12-cyclopentenylhexacycloheptadecene, and 12-phenylhexacycloheptadecene; cyclic olefin monomers in which $R_1$ to $R_4$ are each a functional group including oxygen or a hydrocarbon group having a functional group including oxygen, such as 12-methoxycarbonylhexacycloheptadecene, 12-methyl-12-methoxycarbonylhexacycloheptadecene 12-hydroxymethylhexacycloheptadecene, 12-carboxyhexacycloheptadecene, hexacycloheptadecene-12,13-dicarboxylic acid, and hexacycloheptadecene-12,13-dicarboxylic acid anhydride; cyclic olefin monomers in which $R_1$ to $R_4$ are each a functional group including nitrogen or a hydrocarbon group having a functional group including nitrogen, such as 12-cyanohexacycloheptadecene and hexacycloheptadecene-12,13-dicarboxylic acid imide; cyclic olefin monomer in which $R_1$ to $R_4$ are each a halogen or a hydrocarbon group having a functional group including a halogen, such as 12-chlorohexacycloheptadecene; and cyclic olefin monomer in which $R_1$ to $R_4$ are each a functional group including silicon or a hydrocarbon group having a functional group including silicon, such as 12-trimethoxysilylhexacycloheptadecene.

The structure of dicyclopentadiene (DCPD) can be expressed by the following structural formula (2). The dicyclopentadiene expressed by structural formula (2) may be in an endo form an exo form, or may include both forms.

(2)

The structure of 5-ethylidenenorbornene (EdNB) is expressed by the following structural formula (3):

(3)

The structure of tetracyclododecene (TCD) is expressed by any one of the following structural formulas (4) to (7). Formulas (4) to (7) are isomers of each other. These tetracyclododecenes may be used singly or in combination in the present embodiment.

(4)

(5)

(6)

(7)

In an embodiment of the invention, a monocyclic cycloolefin, such as cyclobutene, cyclopentene, cyclooctene, cyclododecene or 1,5-cyclooctadiene, or a derivative of the monocyclic cycloolefin may be added to the cyclic olefin monomer, and thus a cyclic olefin monomer mixture can be used.

Polymerization Catalyst

The polymerization of a cyclic olefin monomer is performed by bringing the cyclic olefin monomer into contact with a polymerization catalyst. The polymerization catalyst used herein is not particularly limited as long as it can induce the ring opening metathesis polymerization of the cyclic olefin monomer.

The polymerization catalyst may be (a) a Group 4 to 8 transition metal-carbene complex catalyst, or (b) a catalyst prepared by combining a transition metal compound and an alkylating agent capable of functioning as a promoter or a Lewis acid.

Examples of the catalyst include tungsten alkylidene complexes, such as W(N-2,6-i-$Pr_2C_6H_3$)(CH-t-Bu)(O-t-Bu)$_2$, W(N-2,6-i-$Pr_2C_6H_3$)(CH-t-Bu)(OMe$_2$CF$_3$)$_2$, W(N-2,6-i-$Pr_2C_6H_3$)(CH-t-Bu)(OMe (CF$_3$)$_2$)$_2$, W(N-2,6-i-$Pr_2C_6H_3$)(CHCMe$_2$Ph)(O-t-Bu)$_2$, W(N-2,6-i-$Pr_2C_6H_3$)(CHCMe$_2$Ph)(OCMe$_2$CF$_3$)$_2$, and W(N-2,6-i-$Pr_2C_6H_3$)(CHCMe$_2$Ph))OCMe(CF$_3$)$_2$)$_2$; molybdenum alkylidene complexes, such as Mo(N-2,6-i-$Pr_2C_6H_3$)(CH-t-Bu)(O-t-Bu)$_2$. Mo(N-2,6-i-$Pr_2C_6H_3$)(CH-t-Bu)(OCMe$_2$CF$_3$)$_2$, Mo(N-2,6-i-$Pr_2C_6H_3$)(CH-t-Bu)(OCMe(CF$_3$)$_2$)$_2$, Mo(N-2,6-i-$Pr_2C_6H_3$)(CHCMe$_2$Ph)(O-t-Bu)$_2$, Mo(N-2,6-i-$Pr_2C_6H_3$)(CHCMe$_2$Ph)(OCMe$_2$CF$_3$)$_2$, Mo(N-2,6-i-$Pr_2C_6H_3$)(CHCMe$_2$Ph))OCMe(CF$_3$)$_2$)$_2$, Mo(N-2,6-i-$Pr_2C_6H_3$)(BIPHEN), and Mo(N-2,6-i-$Pr_2C_6H_3$)(BINO)(THF); and ruthenium carbene complex catalysts, such as bis(tricyclohexylphosphine)benzylidene ruthenium dichloride, bis(triphenylphosphine)-3,3-diphenylpropenylidene ruthenium dichloride, bis(1,3-diisopropylimidazolidine-2-ylidene)benzylidene ruthenium dichloride, bis(1,3-dicyclohexylimidazolidine-2-ylidene)benzylidene ruthenium dichloride, bis(1,3-diisopropyl-4-imidazoline-2-ylidene)benzylidene ruthenium dichloride, bis(1,3-dicyclohexyl-4-imidazoline-2-ylidene)benzylidene ruthenium dichloride, (1,3-dicyclohexylimidazolidine-2-ylidene)(tricyclohexylphosphine)benzylidene ruthenium dichloride, (1,3-dicyclohexyl-4-imidazoline-2-ylidene)(tricyclohexylphosphine)benzylidene ruthenium dichloride, (1,3-dimesitylimidazolidine-2-ylidene)(tricyclohexylphosphine)benzylidene ruthenium dichloride, (1,3-dimesityl-4-imidazoline-2-ylidene)(tricyclohexylphosphine)benzylidene ruthenium dichloride, and [1,3-di(1'-phenylethyl)-4-imidazoline-2-ylidene](tricyclohexylphosphine)benzylidene ruthenium dichloride. Me represents methyl; i-Pr represents isopropyl; t-Bu represents tert-butyl; and Ph represents phenyl. Also, BINO represents a 1,1'-dinaphthyl-2,2'-dioxy group, and THF represents tetrahydrofuran.

Examples of the transition metal compound of the catalyst prepared by combining a transition metal compound and an alkylating agent or a Lewis acid include MoCl$_4$, MoBr$_2$, MoBr$_3$, MOBr$_4$, WCl$_2$, WBr$_2$, WCl$_4$, WBr$_4$, WCl$_5$, and WBr$_5$.

Examples of the alkylating agent capable of functioning as a promoter include methyl lithium, ethyl lithium, n-butyl lithium, methylmagnesium chloride, and methylmagnesium bromide. Examples of the Lewis acid include trimethyl aluminum, triethyl aluminum, triisopropyl aluminum, tetramethyl tin, tetraethyl tin, and tetrabutyl tin.

Since Group 4 to 8 transition metal carbene complex catalysts have high catalytic activities, these catalysts, particularly ruthenium carbene complex catalysts, can be used. Although the reaction of the ring opening metathesis polymerization can proceed in the absence of a solvent, it may be the case, from the viewpoint of increasing the viscosity during the polymerization, that the polymerization is performed in an organic solvent.

Examples of such an organic solvent include aliphatic hydrocarbons, such as pentane, hexane, and heptane; alicyclic hydrocarbons, such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindene, and cyclooctane; aromatic hydrocarbons, such as benzene, toluene, and xylene; nitrogen-containing hydrocarbons, such as nitromethane, nitrobenzene, and acetonitrile; and ethers, such as diethyl ether and tetrahydrofuran. Among those, aromatic hydrocarbons, aliphatic hydrocarbons, alicyclic hydrocarbons and ethers may be advantageously used.

The mole ratio of the polymerization catalyst to the cyclic olefin monomer can be 1:100 to 1:1,000,000, such as 1:1,000 to 1:500,000. If the catalyst is used in an excessively high ratio, it becomes difficult to remove the catalyst, and an excessively low ratio of the catalyst cannot produce a sufficient polymerization activity.

The mole ratio of the cyclic olefin monomer to the compound having a carbon-carbon double bond is controlled so that the cyclic olefin polymer has a weight average molecular weight in the range described in the section of the organic-inorganic composite particles. For example, when the mole ratio of the compound having a carbon-carbon double bond to the cyclic olefin monomer is in the range of 0.01 mol % to 100 mol %, the resulting organic-inorganic composite particles can contain a cyclic olefin polymer having a desired molecular weight.

If the polymerization is performed in an organic solvent, the concentration of the cyclic olefin monomer in the solvent can be in the range of 1% to 60% by mass, such as 5% to 40% by mass. The cyclic olefin monomer in a concentration of 1% by mass or more can exhibit high productivity. The cyclic olefin monomer in a concentration of 60% by mass or less is unlikely to become difficult to treat, without excessively increasing the viscosity of the solution after the polymerization.

The polymerization can be performed at a temperature of, but is not limited to, −30 to +200° C., such as 0 to 180° C. The polymerization time may be, but is not limited to, 1 minute to 100 hours. As will be described later, for the hydrogenation of the cyclic olefin polymer, the carbon-carbon double bond of the main chain of the cyclic olefin polymer is hydrogenated with a known hydrogenation catalyst such as a homogeneous hydrogenation catalyst mainly containing a Group 8 to 10 transition metal compound or a supported hydrogenation catalyst containing a Group 8 to 10 transition metal supported on a carrier.

The hydrogenation reaction is performed in an inert organic solvent. Any inert organic solvent can be used and may be selected from the above listed solvents used for polymerization. Among those, aromatic hydrocarbons, alicyclic hydrocarbons and ethers are particularly superior in solubility of hydrogenated polymers.

The hydrogenation conditions differ depending on the hydrogenation catalyst. The hydrogenation can be performed at a temperature of, for example, −20 to +250° C., such as −10 to +220° C. or 0 to 200° C. The hydrogen pressure can be in the range of, for example, 0.01 to 10 MPa, such as 0.05 to 8 MPa or 0.1 to 5 MPa. If the hydrogenation temperature is excessively low, the reaction rate is reduced. In contrast, an excessively high hydrogenation temperature causes a side reaction. If the hydrogen pressure is excessively low, the hydrogenation rate is reduced. In contrast, if the hydrogen pressure is excessively high, a pressure-resistant reactor is required.

The hydrogenation catalyst can be removed by the following method. If a homogeneous catalyst is used, for example, an oxidizing agent or a base compound and a poor solvent to the reaction liquid, such as water or methanol, are added to the reaction liquid after the polymerization so that the homogeneous catalyst is converted into a metal oxide or a metal salt so as to be extracted into the poor solvent. Then, the catalyst is removed by filtration or centrifugation. Alternatively, the catalyst may be removed by being adsorbed to an adsorbent.

The homogeneous catalyst may be removed by being extracted into an acid aqueous solution, such as hydrochloric acid. If a supported hydrogenation catalyst is used, the catalyst can be easily separated by centrifugation or filtration.

Cyclic Olefin Polymer

The cyclic olefin polymer used herein refers to a polymer of the cyclic olefin monomer, having a degree of polymerization of 2 or more. The cyclic olefin polymer mentioned herein may be a copolymer of at least two types of cyclic olefin monomer. The copolymer may be a block copolymer, a random copolymer, or a graft copolymer. The cyclic olefin polymer may be hydrogenated.

The cyclic olefin polymer can have a polystyrene-equivalent weight average molecular weight (measured by gel permeation chromatography) in the range of 1,000 to 1,000,000, such as 3,000 to 200,000. A cyclic olefin polymer having a weight average molecular weight of 1,000 or more can produce a sufficient repulsion due to its steric repulsion among the inorganic particles, and thus can prevent the aggregation of the inorganic particles. When the molecular weight is 1,000,000 or less, the solubility of the cyclic olefin polymer in organic solvent can be increased, and the cyclic olefin polymer can be easily hydrogenated after the polymerization.

The organic-inorganic composite particles of the present embodiment have a high compatibility with the cyclic olefin polymer. This is because both the cyclic olefin polymer and the cyclic olefin polymer coating the surfaces of the inorganic particles have the common feature of having alicyclic structures in their main chains. In addition, probably, the steric repulsion among the molecules of the cyclic olefin polymer coating the surfaces of the inorganic particles can prevent the aggregation of the inorganic particles.

Organic-Inorganic Composite Particles

The organic-inorganic composite particles of the present embodiment includes tantalum oxide particles or aluminium oxide particles and a cyclic olefin polymer coating the surfaces of the inorganic particles, and have a volume average particle size of 30 nm or less.

The cyclic olefin polymer can have a weight average molecular weight in the range of 1,000 to 1,000,000.

The volume average particle size of the organic-inorganic composite particles mentioned herein is a value measured by dynamic light scattering (DLS), and is more specifically a value measured with a dynamic light scattering particle size analyzer ZETASIZER Nano-S manufactured by Malvern.

Probably, the organic-inorganic composite particles including inorganic particles coated with at least either a cyclic olefin monomer or a cyclic olefin polymer have a structure in which the surfaces of the inorganic particles are modified into a prickle-like state with the cyclic olefin polymer, like the structure designated by 103 in FIG. 1. Accordingly, hereinafter, the organic-inorganic composite particles may be referred to as inorganic particles grafted with a cyclic olefin polymer or cyclic olefin polymer-grafted inorganic particles. For example, when γ-alumina particles are used as the inorganic particles and polydicyclopentadiene is used as the cyclic olefin polymer, the organic-inorganic composite particles are γ-alumina particles grafted with polydicyclopentadiene or polydicyclopentadiene-grafted γ-alumina particles.

Production of Optical Material

A method for producing an optical material according to an embodiment of the invention includes mixing organic-inorganic composite particles prepared by the above-described method and a cyclic olefin monomer; and polymerizing the cyclic olefin monomer.

Since the inorganic particles of the organic-inorganic composite particles prepared by the method for producing organic-inorganic composite particles of the present embodiment are coated with a cyclic olefin polymer being a thermoplastic resin, they can easily disperse into the cyclic olefin monomer and also into a cyclic olefin polymer that has been polymerized from the cyclic olefin monomer. When the organic-inorganic composite particles and the cyclic olefin monomer are mixed together, a crosslinking agent, a crosslinking aid, a solvent and any other compounding ingredient may be added.

In the production of the optical material, the ratio of the organic-inorganic composite particles to the cyclic olefin polymer can be, but is not limited to, 5% to 80% by mass, such as 20% to 60% by mass. If the amount of the organic-inorganic particles is 5% by mass or more, the inorganic particles can sufficiently act on the characteristics of the cyclic olefin polymer, and accordingly, a cyclic olefin polymer-inorganic particle composite material having a desired characteristic can readily be obtained. If the amount of the organic-inorganic particles is 80% by mass or less, the optical material becomes brittle.

Method for Manufacturing an Optical Element

A method for manufacturing an optical element according to an embodiment of the invention includes preparing an optical material by the method for producing an optical material, and molding the optical material. For molding the optical material, the organic-inorganic composite particles may be used singly or in combination with a thermoplastic resin containing a cyclic olefin polymer into which the organic-inorganic composite particles can be dispersed.

Figure 3:
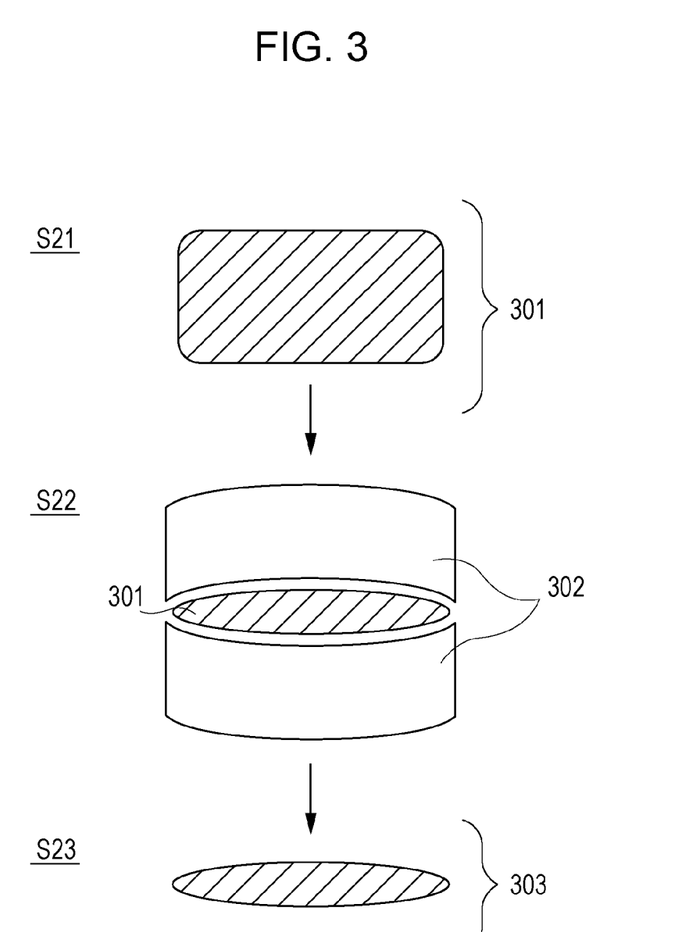
FIG. 3 is a flow diagram of a method for manufacturing an optical element according to an embodiment of the present invention.

The method for manufacturing an optical element of the present embodiment will be further described with reference to FIG. 3. First, the optical material 301 obtained by the above method is prepared (S21). Then, a shaping die 302 is charged with the optical material 301 (S22). The optical material is hardened to form an optical element 303. The optical material 301 may be a liquid containing the organic-inorganic complex material sufficiently dispersed in a cyclic olefin monomer, or may be a liquid turned from a solid containing the organic-inorganic composite material dispersed in a cyclic olefin polymer. Accordingly, in the step of S22, the optical material 301 in the shaping die may be polymerized, or the optical material 301 may be cooled. The molding of the optical material may be performed by injection molding, transfer molding, blow molding, rotational molding, vacuum forming, extrusion, calendar molding, solution casting, hot pressing, or inflation molding, but the method is not limited to these as long as the optical material can be molded.

The molded optical material can have any shape. For example, it may be spherical, bar-like, plate-like, cylindrical, tubular, fibrous, or film/sheet-like. Since the organic-inorganic composite particles of the present embodiment can be easily dispersed in the above-listed organic solvents, such as aromatic hydrocarbons, alicyclic hydrocarbons and ethers, cast molding can be applied.

Exemplary optical elements include lenses, optical thin films, diffractive optical elements and polarizers. For a lens, an antireflection film may be formed on the surface of the optical element or the lens in a method for manufacturing a lens, as described below.

Method for Manufacturing a Lens

A method for manufacturing a lens according to an embodiment of the invention includes preparing an optical element by the method for manufacturing an optical element, and forming an antireflection film over the surface of the optical element.

EXAMPLES

The present invention will be further described with reference to Examples, but it is not limited to the following Examples.

Example 1

Synthesis of γ-alumina Particles Coated with Compound Having Carbon-Carbon Double Bond Composition:
  Inorganic particles: γ-alumina particles (TM-300, crystallite size 7 nm, produced by Taimei Chemicals), 3.0 g;
  Compound having a carbon-carbon double bond: allyltriethoxysilane (Allyl-Si), 1.5 g
  Dispersant: decyltrimethoxysilane (Decyl-Si), 1.5 g
  Additive: triethylamine ($NEt_3$), 0.6 g
  Organic solvent: tetrahydrofuran (THF), 25 g The mixture of the above components was placed in a 100 mL vessel, and was subjected to pretreatment in a bead mill disperser UAM-015 (manufactured by Aimex) at a rotation speed of 650 rpm for 10 minutes. Subsequently, 104 g (filling rate: 50%) of zirconia beads of 30 μm in diameter were further added to the vessel, and the mixture was subjected to main treatment at a rotation speed of 1600 rpm for 360 minutes. The resulting slurry was filtered to remove the zirconia beads, and thus a THF dispersion was prepared of γ-alumina particles coated with Allyl-Si being a compound having a carbon-carbon double bond (Dispersion A).

Synthesis of Cyclic Olefin Polymer-Grafted γ-alumina Particles

Composition:
  Dispersion A, 10 g
  Cyclic olefin monomer: dicyclopentadiene (DCPD), 3 g
  Polymerization catalyst: Grubbs Catalyst 2nd Generation ((1,3-dimesitylimidazolidine-2-ylidene)(tricyclohexylphosphine)benzylidene ruthenium dichloride), 0.0005 g
  Organic solvent: THF, 10 g The mixture of the above components was introduced to a glass reactor equipped with a stirrer purged with nitrogen, and was subjected to polymerization at 70° C. The polymerization proceeded in a uniform condition. After two hours, the resulting polymer solution was cooled to room temperature, and 0.0005 g of ethyl vinyl ether was added as polymerization terminator. The reaction liquid was poured into a large amount of acetone/methanol mixture (2:1) to precipitate a solid. After separation by filtration and washing, the solid was dried under reduced pressure at 40° C. for 18 hours to yield 3.3 g of γ-alumina particles grafted with polydicyclopentadiene. The grafting polydicyclopentadiene had a weight average molecular weight of $5.0 \times 10^3$. The weight average molecular weight was measured by chromatography at 40° C. through two Shodex LF-804 columns (Showa Denko) arranged in series using THF as the eluent with a gel permeation chromatograph (GPC) manufactured by WATERS, and refractive indices (RI) were measured with a differential RI detector.

The resulting polydicyclopentadiene-grafted γ-alumina particles were dispersed again in THF, and the volume average particle size of the polydicyclopentadiene-grafted γ-alumina particles was measured by DLS (with a dynamic light scattering particle size analyzer ZETASIZER Nano-S manufactured by Malvern). The result was 30 nm. Subsequently, the dispersibility of the polydicyclopentadiene-grafted γ-alumina particles in a cyclic olefin polymer was evaluated.

Dispersibility Test
Composition:
  Polydicyclopentadiene-grafted γ-alumina particles, 0.1 g
  Cyclic olefin polymer: E48R (produced by Zeon), 1 g
  Organic solvent: cyclohexane, 9 g The mixture of the above components was subjected to ultrasonic treatment for 30 minutes, and the dispersibility of the particles was visually evaluated. The mixture seemed to be a transparent homogeneous solution, and aggregates of the γ-alumina particles were not observed in the solution. Thus, the γ-alumina particles exhibited a high dispersibility in the cyclic olefin polymer solution. The solution was formed into a film by a cast method. The resulting film was transparent, and aggregates of the particles were not observed in the film.

Example 2

For the synthesis of γ-alumina particles coated with a compound having a carbon-carbon double bond, the same operation as in Example 1 was performed except that 1.0 g of decyltrimethoxysilane was used instead of 2.0 g of allyltriethoxysilane. The polymerization proceeded in a uniform condition to yield 3.3 g of polydicyclopentadiene-grafted γ-alumina particles. The grafted polydicyclopentadiene had a weight average molecular weight of $4.6 \times 10^3$. The resulting polydicyclopentadiene-grafted γ-alumina particles were dispersed again in THF, and the volume average particle size of the polydicyclopentadiene-grafted γ-alumina particles was measured by DLS. The result was 25 nm.

The dispersibility of the grafted particles was evaluated. As a result, the dispersion liquid seemed to be a transparent homogeneous solution and aggregates of the particles were not observed in the solution. The solution was formed into a film by a cast method. The resulting film was transparent, and aggregates of the particles were not observed in the film.

Example 3

For the synthesis of γ-alumina particles coated with a compound having a carbon-carbon double bond, the same operation as in Example 1 was performed except that 0.75 g of decyltrimethoxysilane was used instead of 2.25 g of allyltriethoxysilane. The polymerization proceeded in a uniform condition to yield 3.4 g of polydicyclopentadiene-grafted γ-alumina particles. The grafted polydicyclopentadiene had a weight average molecular weight of $3.9 \times 10^3$. The resulting polydicyclopentadiene-grafted γ-alumina particles were dispersed again in THF, and the volume average particle size of the polydicyclopentadiene-grafted γ-alumina particles was measured by DLS. The result was 21 nm.

The dispersibility of the grafted particles was evaluated. As a result, the dispersion liquid seemed to be a transparent homogeneous solution and aggregates of the particles were not observed in the solution. The solution was formed into a film by a cast method. The resulting film was transparent, and aggregates of the particles were not observed in the film.

Example 4

For the synthesis of cyclic olefin polymer-grafted γ-alumina particles, the same operation as in Example 1 was performed except that 5-ethylidenenorbornene was used instead of dicyclopentadiene. The polymerization proceeded in a uniform condition to yield 3.3 g of poly(5-ethylidenenorbornene)-grafted γ-alumina particles. The grafted poly(5-ethylidenenorbornene) had a weight average molecular weight of $4.5 \times 10^3$. The resulting poly(5-ethylidenenorbornene)- grafted γ-alumina particles were dispersed again in THF, and the volume average particle size of the poly(5-ethylidenenorbornene)-grafted γ-alumina particles was measured by DLS. The result was 24 nm.

The dispersibility of the grafted particles was evaluated. As a result, the dispersion liquid seemed to be a transparent homogeneous solution and aggregates of the particles were not observed in the solution. The solution was formed into a film by a cast method. The resulting film was transparent, and aggregates of the particles were not observed in the film.

Example 5

For the synthesis of cyclic olefin polymer-grafted γ-alumina particles, the same operation as in Example 1 was performed except that tetracyclododecene was used instead of dicyclopentadiene. The polymerization proceeded in a uniform condition to yield 3.1 g of poly(tetracyclododecene)-grafted γ-alumina particles. The grafted poly(tetracyclododecene) had a weight average molecular weight of $2.9 \times 10^3$. The resulting poly(tetracyclododecene)-grafted γ-alumina particles were dispersed again in THF, and the volume average particle size of the poly(tetracyclododecene)-grafted γ-alumina particles was measured by DLS. The result was 20 nm.

The dispersibility of the grafted particles was evaluated. As a result, the dispersion liquid seemed to be a transparent homogeneous solution and aggregates of the particles were not observed in the solution. The solution was formed into a film by a cast method. The resulting film was transparent, and aggregates of the particles were not observed in the film.

Example 6

For the synthesis of cyclic olefin polymer-grafted γ-alumina particles, the same operation as in Example 1 was performed except that the mixture of 2.1 g of dicyclopentadiene and 0.9 g of 5-ethylidenenorbornene was used instead of 3.0 g of dicyclopentadiene. The polymerization proceeded in a uniform condition to yield 3.2 g of γ-alumina particles grafted with a copolymer of dicyclopentadiene and 5-ethylidenenorbornene. The grafted copolymer of dicyclopentadiene and 5-ethylidenenorbornene had a weight average molecular weight of $4.8 \times 10^3$. The resulting γ-alumina particles grafted with the copolymer of dicyclopentadiene and 5-ethylidenenorbornene were dispersed again in THF, and the volume average particle size of the copolymer-grafted γ-alumina particles was measured by DLS. The result was 28 nm. The dispersibility of the grafted particles was evaluated. As a result, the dispersion liquid seemed to be a transparent homogeneous solution and aggregates of the particles were not observed in the solution. The solution was formed into a film by a cast method. The resulting film was transparent, and aggregates of the particles were not observed in the film.

Example 7

A THF dispersion of $Ta_2O_5$ particles coated with Allyl-Si being a compound having a carbon-carbon double bond was prepared in the same manner as in Example 1, except that $Ta_2O_5$ particles were used instead of γ-alumina particles and that the amounts of allyltriethoxysilane and decyltrimethoxysilane were 2.0 g and 1.0 g, respectively. (The resulting THF dispersion is called Dispersion B.) For the synthesis of cyclic olefin polymer-grafted inorganic particles, the same operation as in Example 1 was performed except that Dispersion B was used instead of Dispersion A. The polymerization proceeded in a uniform condition to yield 2.9 g of polydicyclopentadiene-grafted $Ta_2O_5$ particles. The grafted polydicyclopentadiene had a weight average molecular weight of $5.0 \times 10^3$. The resulting polydicyclopentadiene-grafted $Ta_2O_5$ particles were dispersed again in THF, and the volume average particle size of the polydicyclopentadiene-grafted $Ta_2O_5$ particles was measured by DLS. The result was 17 nm.

The dispersibility of the grafted particles was evaluated. As a result, the dispersion liquid seemed to be a transparent homogeneous solution, and aggregates of the particles were not observed in the solution. The solution was formed into a film by a cast method. The resulting film was transparent, and aggregates of the particles were not observed in the film.

Comparative Example 1

The synthesis of γ-alumina particles coated with a compound having a carbon-carbon double bond was performed in the same manner as in Example 1 except that 3.0 g of decyltrimethoxysilane was used instead of the mixture of allyltriethoxysilane and decyltrimethoxysilane, and the synthesis of cyclic olefin polymer-grafted γ-alumina particles was performed in the same manner as in Example 1 except that 0.1 g of 1-hexene was added.

As the polymerization proceeded, γ-alumina particles were aggregated and the reaction liquid became clouded. The solid collected from the reaction liquid was evaluated for the dispersibility. It was found that the aggregates of the γ-alumina particles clouded the reaction liquid.

Comparative Example 2

The same operation as in Comparative Example 1 was performed except that 3.0 g of cyclopentyltrimethoxysilane (CyPentyl-Si) was used instead of decyltrimethoxysilane. As the polymerization proceeded, γ-alumina particles were aggregated and the reaction liquid became clouded. The solid collected from the reaction liquid was evaluated for the dispersibility. It was found that the aggregates of the γ-alumina particles clouded the reaction liquid.

Comparative Example 3

Composition

Dicyclopentadiene: 10 g
Allyltriethoxysilane: 2 g
Grubbs Catalyst 2nd Generation: 0.0032 g
THF: 50 g The mixture of the above components was introduced to a glass reactor equipped with a stirrer purged with nitrogen, and was subjected to polymerization at 70° C. The polymerization proceeded in a uniform condition. After two hours, the resulting polymer solution was cooled to room temperature, and 0.0005 g of ethyl vinyl ether was added as polymerization terminator. The reaction liquid was poured into a large amount of acetone/methanol mixture (2:1) to precipitate a solid. After separation by filtration and washing, the solid was dried under reduced pressure at 40° C. for 18 hours to yield 7.3 g of polydicyclopentadiene (polyDCPD-Si) having an ethoxysilyl group bound to the end thereof (weight average molecular weight: $5.1 \times 10^3$). Subsequently, the resulting polyDCPD-Si was used as a surface modifier, and thus a polydicyclopentadiene-grafted γ-alumina particles were obtained.

Composition:

Surface modifier: polyDCPD-Si, 4 g

Inorganic particles: γ-alumina particles TM-300 (crystallite size 7 nm, produced by Taimei Chemicals), 1 g Additive: $NEt_3$, 0.2 g Organic solvent: THF, 25 g The mixture of the above components was placed in a 100 mL vessel, and was subjected to pretreatment in a bead mill disperser UAM-015 (manufactured by Aimex) at a rotation speed of 650 rpm for 10 minutes. Subsequently, 104 g (filling rate: 50%) of zirconia beads of 30 μm in diameter were further added to the vessel, and the mixture was subjected to main treatment at a rotation speed of 1600 rpm for 360 minutes. The resulting slurry was filtered to remove the zirconia beads, and thus a THF dispersion was prepared of polydicyclopentadiene-grafted γ-alumina particles.

The resulting THF dispersion was slightly clouded. The volume average particle size of the polydicyclopentadiene-grafted γ-alumina particles in the dispersion was measure by DLS, and the result was 55 nm.

The grafted particles were evaluated for dispersibility. Although the γ-alumina particles were uniformly dispersed, the liquid and film were slightly clouded.

From the results of the Examples and Comparative Examples, it was found that in order to disperse inorganic particles uniformly in a cyclic olefin polymer, a compound having a carbon-carbon double bond should be bound to the inorganic particles in a ring opening metathesis polymerization. The method of the present embodiment of the invention can produce cyclic olefin-grafted inorganic particles having a higher dispersibility in cyclic olefin polymer and a smaller volume average particle size than those produced by a known method. Accordingly, highly transparent cyclic olefin polymer-inorganic composite particles can be advantageously produced.

Figure 4:
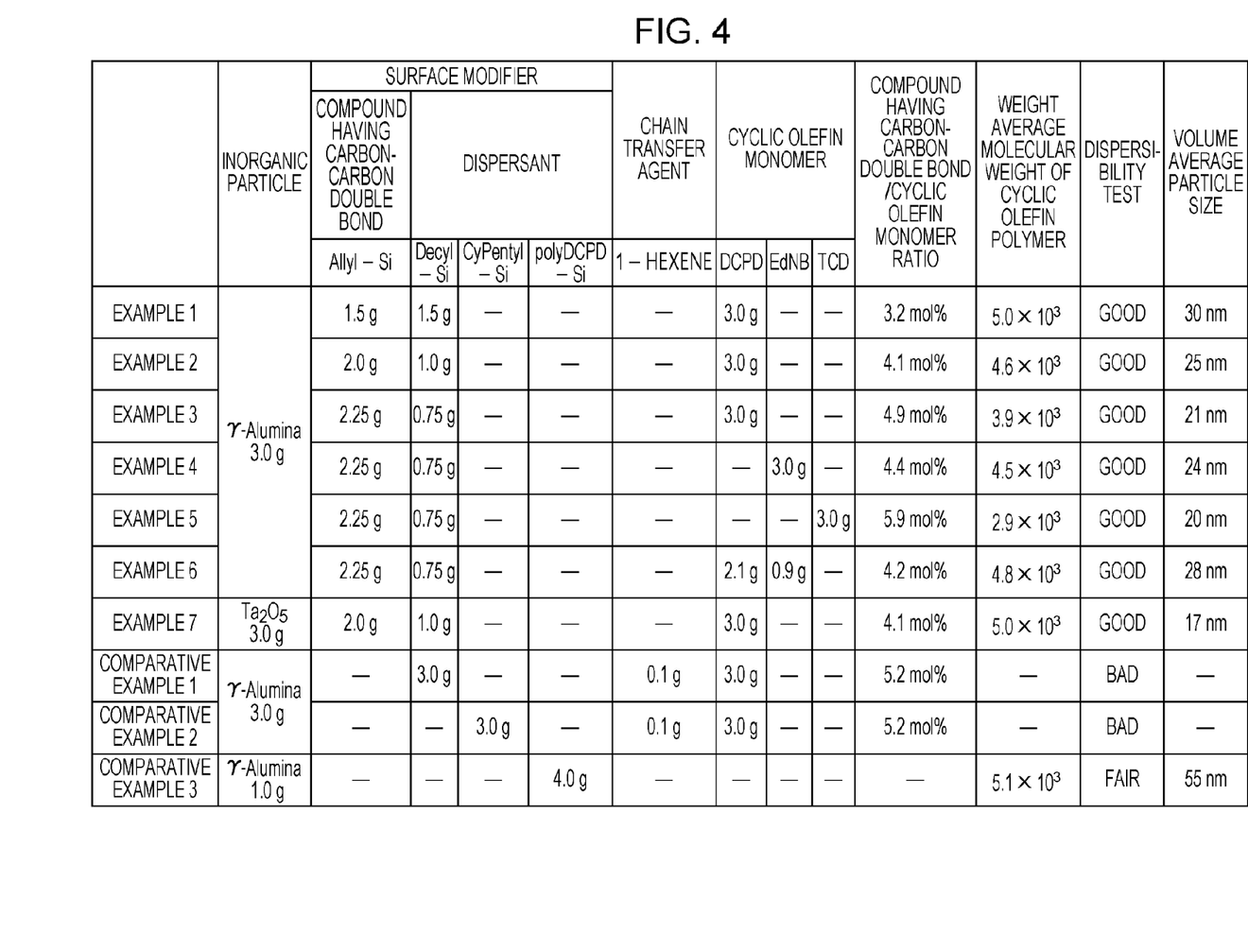
FIG. 4 is the table showing the results of Examples of the invention and Comparative Examples.

The results of the above Examples and Comparative Examples are shown in FIG. 4.

The dispersibility was evaluated as follows:

Good: uniformly dispersed and transparent;

Fair: uniformly dispersed, but slightly clouded; and

Bad: aggregated.

The organic-inorganic composite particles produced by the method of the embodiments of the invention, and the cyclic olefin polymer-inorganic composite material produced from the composite particles can be used in the fields of optical materials, electronic component materials, and recording materials.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-011422 filed Jan. 21, 2010, which is hereby incorporated by reference herein in its entirety.

What is claimed is:

1. A method for producing an optical material comprising organic-inorganic composite particles, the method comprising:

preparing inorganic oxide particles, each coated with a mixture comprising a compound having a carbon-carbon double bond and having an alkoxysilyl group and a dispersant having an alkoxysilyl group; and binding a cyclic olefin monomer expressed by general formula (1) or a cyclic olefin polymer derived from the cyclic olefin monomer to the carbon-carbon double bond of the inorganic oxide particles by bringing the cyclic olefin monomer into contact with the inorganic oxide particles coated with the compound in the presence of a catalyst for metathesis reaction:

(1)

wherein $R_1$ to $R_4$ each selected from the group consisting of hydrogen, halogens, functional groups including at least one atom selected from the group consisting of oxygen, nitrogen and silicon, and hydrocarbon groups having a carbon number in the range of 1 to 20 that may have a substituent being a functional group including at least one atom selected from the group consisting of halogens, oxygen, nitrogen and silicon, and wherein $R_1$ and $R_4$ may be bound with each other, and m represents an integer of 0 to 2, wherein the compound having a carbon-carbon double bond and having an alkoxysilyl group is used in a ratio of 3.0 to 6.0 mol % relative to the cyclic olefin monomer, and wherein the optical member comprising the organic-inorganic composite Particles is transparent.

2. The method according to claim 1, wherein the compound having a carbon-carbon double bond and having an alkoxysilyl group comprises allyltriethoxysilane, and the dispersant having an alkoxysilyl group is decyltrimethoxysilane.

3. The method according to claim 2, wherein the cyclic olefin monomer is dicyclopentadiene.

4. The method according to claim 2, wherein the inorganic oxide particles are alumina particles.

5. The method according to claim 1, wherein the compound having a carbon-carbon double bond and having an alkoxysilyl group is a compound having a carbon-carbon double bond and having a trialkoxysilyl group, and the dispersant having an alkoxysilyl group is a dispersant having a trialkoxysilyl group.

6. The method according to claim 1, wherein an amount of the compound having a carbon-carbon double bond and having an alkoxysilyl group is one time or more and three times or less of an amount of the dispersant having an alkoxysilyl group.

7. The method according to claim 1, wherein an amount of the compound having a carbon-carbon double bond and having an alkoxysilyl group is equal to an amount of the dispersant having an alkoxysilyl group.

* * * * *